United States Patent [19]

Chen

[11] Patent Number: 5,117,172
[45] Date of Patent: May 26, 1992

[54] CONTINUOUS BATTERY-CHARGING REPLACING DEVICE

[76] Inventor: Stephen Chen, No. 52, Lane 563, Chang Tzao Road, Changhua, Taiwan

[21] Appl. No.: 619,551

[22] Filed: Nov. 29, 1990

[51] Int. Cl.[5] .......................................... H01M 10/46
[52] U.S. Cl. ............................................ 320/15; 320/2
[58] Field of Search .................................... 320/2, 15

[56] References Cited

U.S. PATENT DOCUMENTS

| | | | |
|---|---|---|---|
| 3,108,192 | 10/1963 | Reich | 320/15 |
| 3,675,108 | 7/1972 | Nicholl | 320/2 |
| 3,735,232 | 5/1973 | Fister | 320/2 |
| 4,016,474 | 4/1977 | Mason | 320/15 |
| 4,227,140 | 10/1980 | Nardella et al. | 320/2 |
| 4,387,332 | 6/1983 | Oyamuda et al. | 320/15 |
| 4,403,182 | 9/1983 | Yeh | 320/2 |
| 4,670,703 | 6/1987 | Williams | 320/15 |
| 4,672,292 | 6/1987 | Hernandez | 320/2 |
| 4,766,361 | 8/1988 | Pusateri | 320/2 |
| 4,782,279 | 11/1988 | Selanger | 320/2 |
| 4,792,743 | 12/1988 | Tsujino et al. | 320/15 |
| 4,816,735 | 3/1989 | Cook et al. | 320/2 |
| 4,849,682 | 7/1989 | Bauer et al. | 320/15 |

FOREIGN PATENT DOCUMENTS 2618748  11/1977  Fed. Rep. of Germany .......... 320/2

*Primary Examiner*—Steven L. Stephan
*Assistant Examiner*—Thomas M. Dougherty
*Attorney, Agent, or Firm*—Browdy and Neimark

[57] ABSTRACT

A continuous battery-charging replacing device suitable for portable camera, walking telephone, portable computer, etc. wherein multiple batteries can be received at a time for sequential charging, the replacing device including a seat member having multiple battery engaging seats and a switch control device pivoted to the seat member and a circuit control device cooperating with the switch control device; the switch control device can associate with a general battery charging device and the engaging seats can receive multiple batteries so that the circuit control device can cooperate with the switch control device for continuously charging the batteries in sequence.

5 Claims, 5 Drawing Sheets

CONTINUOUS BATTERY-CHARGING REPLACING DEVICE

BACKGROUND OF THE INVENTION

The present invention relates to a continuous battery-charging replacing device, and more particularly to a battery-charging replacing device including a seat member having multiple battery-charging seats, and a switch control device pivoted to the seat member and a cooperating circuit control device, wherein the switch control device can associate with a general battery charging device and the seat member can receive multiple batteries whereby the circuit control device and the switch control device can control the charging state to charge the batteries in sequence.

General portable electric appliances, such as a camera, walking telephone and portable computer, are often provided with a special high capacity rechargeable battery 2 and a spare charging device 3, as shown in FIG. 5, due to their large electricity consumption. Although the charging device 3 is provided, in case the electricity consumption is too large, a battery is possible to be exhausted in a short time and disable the camera, etc. The camera can be further used only after the battery is completely recharged. Therefore, a general user will prepare multiple identical rechargeable batteries so as to continuously use the appliance. However, the charging device can only charge one battery at a time and the charging time thereof is at least one to two hours so that after a battery is completely charged, the battery is replaced with another battery to be charged and the user must always pay attention to the charging state of the battery and replace the batteries one by one. As a result, time and labor are wasted and the efficiency of charging is lowered.

SUMMARY OF THE INVENTION

It is therefore a primary object of this invention to provide a continuous battery-charging replacing device capable of receiving multiple batteries, permitting the batteries to be charged in sequence to enhance the charging efficiency of a charging device.

It is a further object of this invention to provide the above continuous battery-charging replacing device including a switch control device and a circuit control device capable of accurately completely charging multiple batteries in sequence to facilitate the charging operation and save time and labor.

The present invention can be best understood through the following description with reference to accompanying drawings wherein:

DETAILED DESCRIPTION OF THE PREFERRED EMBODIMENT

Figure 1:
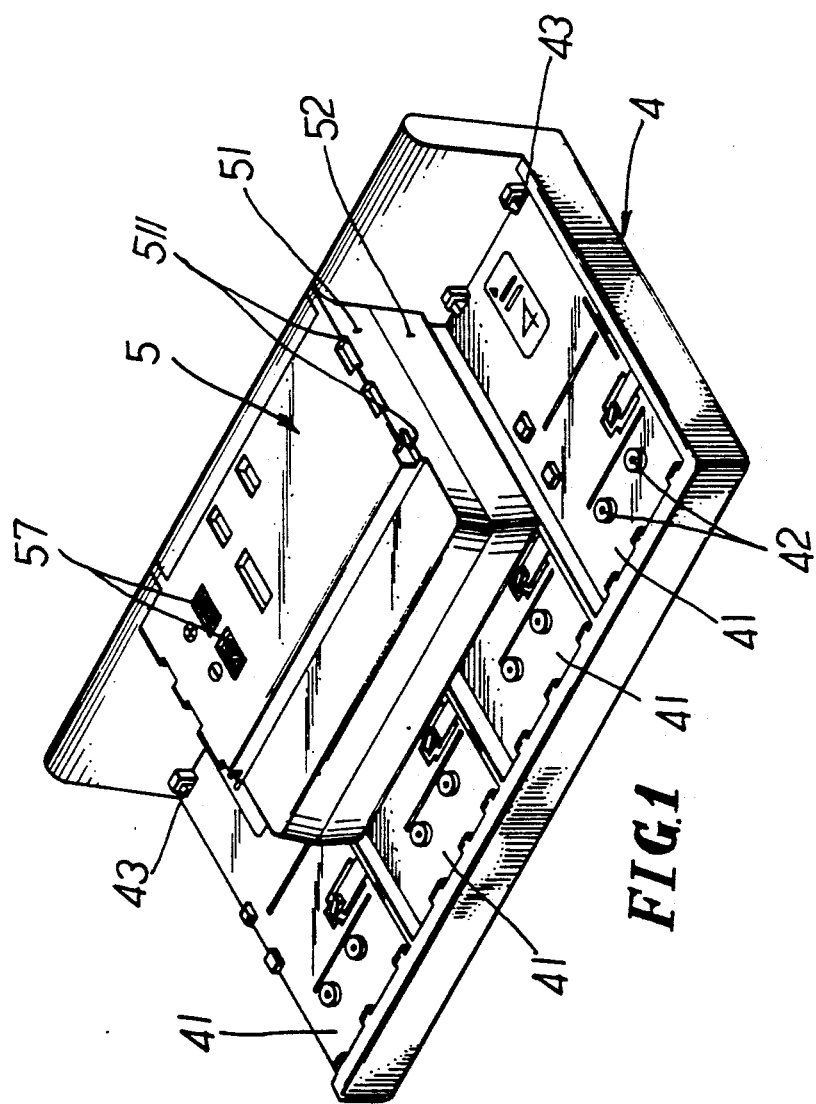
FIG. 1 is a perspective view of this invention.
Figure 2:
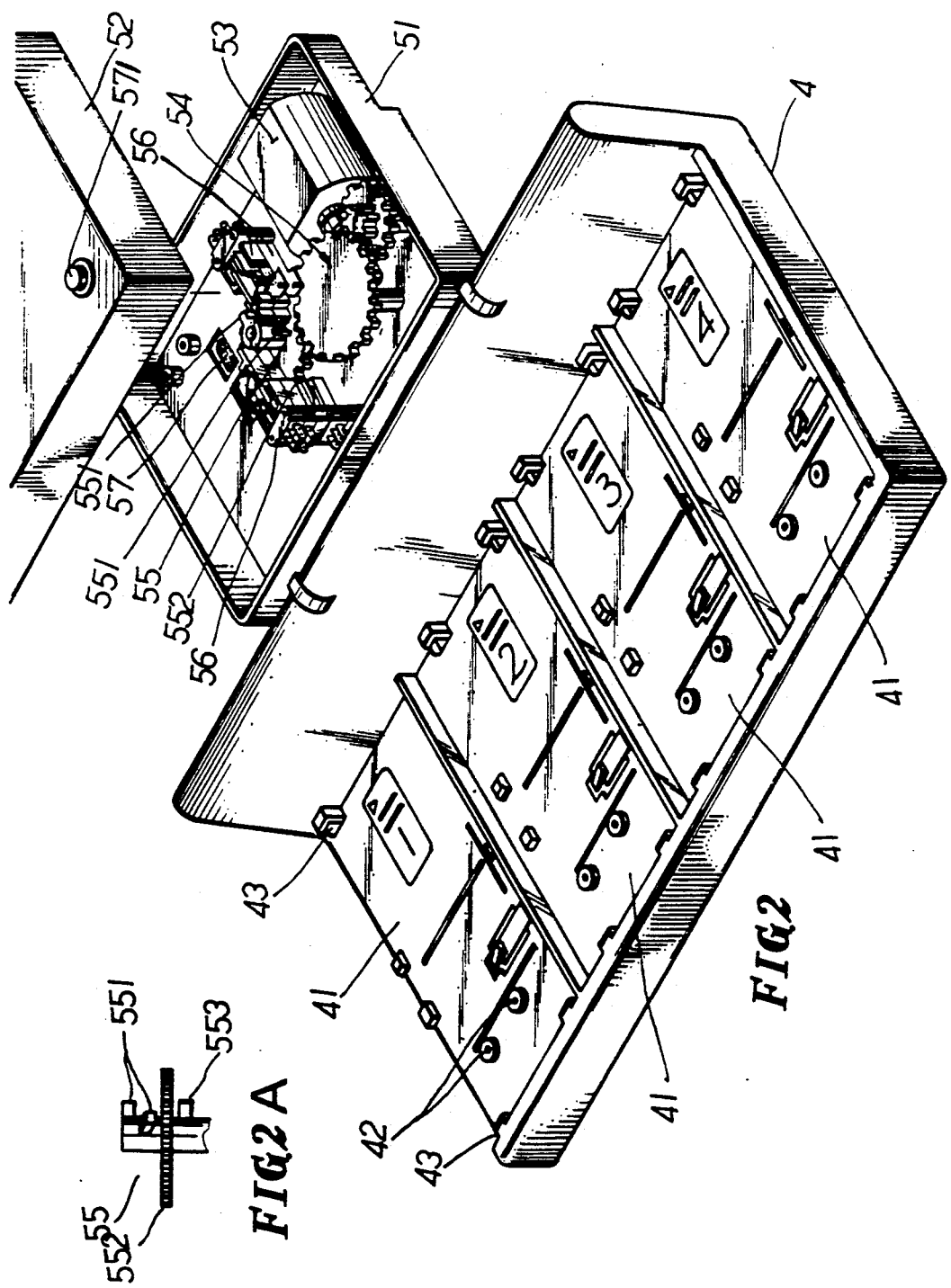
FIG. 2 is a perspective partially exploded view according to FIG. 1, FIG. 2A a detail of part 55 of FIG. 2.

Please first prefer to FIGS. 1 and 2. The present invention includes a seat member 4, a switch control device 5 pivoted to the seat member 4 includes at least two and preferably four to six engaging seats 41 suitable for receiving batteries to be charged. Each engaging seat 41 has at least two conductive terminals 42 and at least two pairs of engaging grooves 43 whereby after the battery is located, the conductive terminals 42 can electrically connect the power source with the battery.

The switch control device 5 includes a base 51 and a cover 52 and a drive motor 53, a reducing gear set 54, an activating member 55, several microswitches 56 and two contact terminals 57 all of which are disposed between the base 51 and the cover 52. The base 51 can associate with an engaging seat of a general charging device 3 and at least has two pairs of engaging grooves 511 for engagement.

The two contact terminals 57 are located on the bottom of the base 51, suitable for electrical connection with the terminals of the charging device 3. The drive motor 53 is used to drive the reducing gear set 54 which can further drive the activating member 55 to sequentially activate the microswitches 56 for controlling the connection of the power source with the conductive terminals 42 of the engaging seats 41. The drive motor 53 is connected with the reducing gear set 54 by coil wheel and pinion while the upper portion of the activiating member 55 has two activiating rods 551 and gear 552 meshing with the reducing gear set 54. The lower portion of the activating member 55 has a rod member 553 capable of controllably and sequentially activating the microswitches. An activating switch 571 is disposed on the surface of the cover 52.

Figure 3:
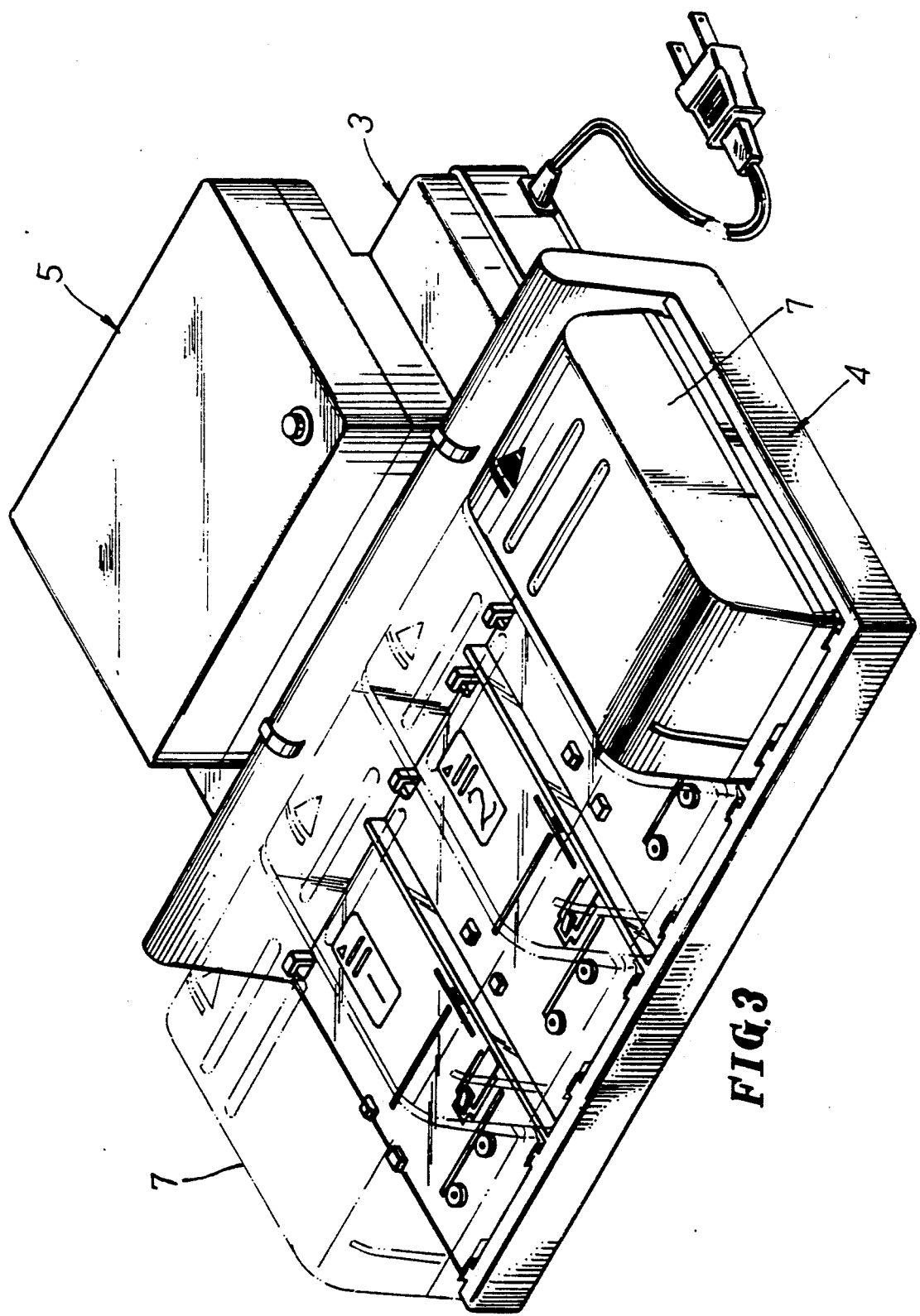
FIG. 3 is a perspective view of this invention connected with a charging device and receiving multiple batteries to be charged.
Figure 4:
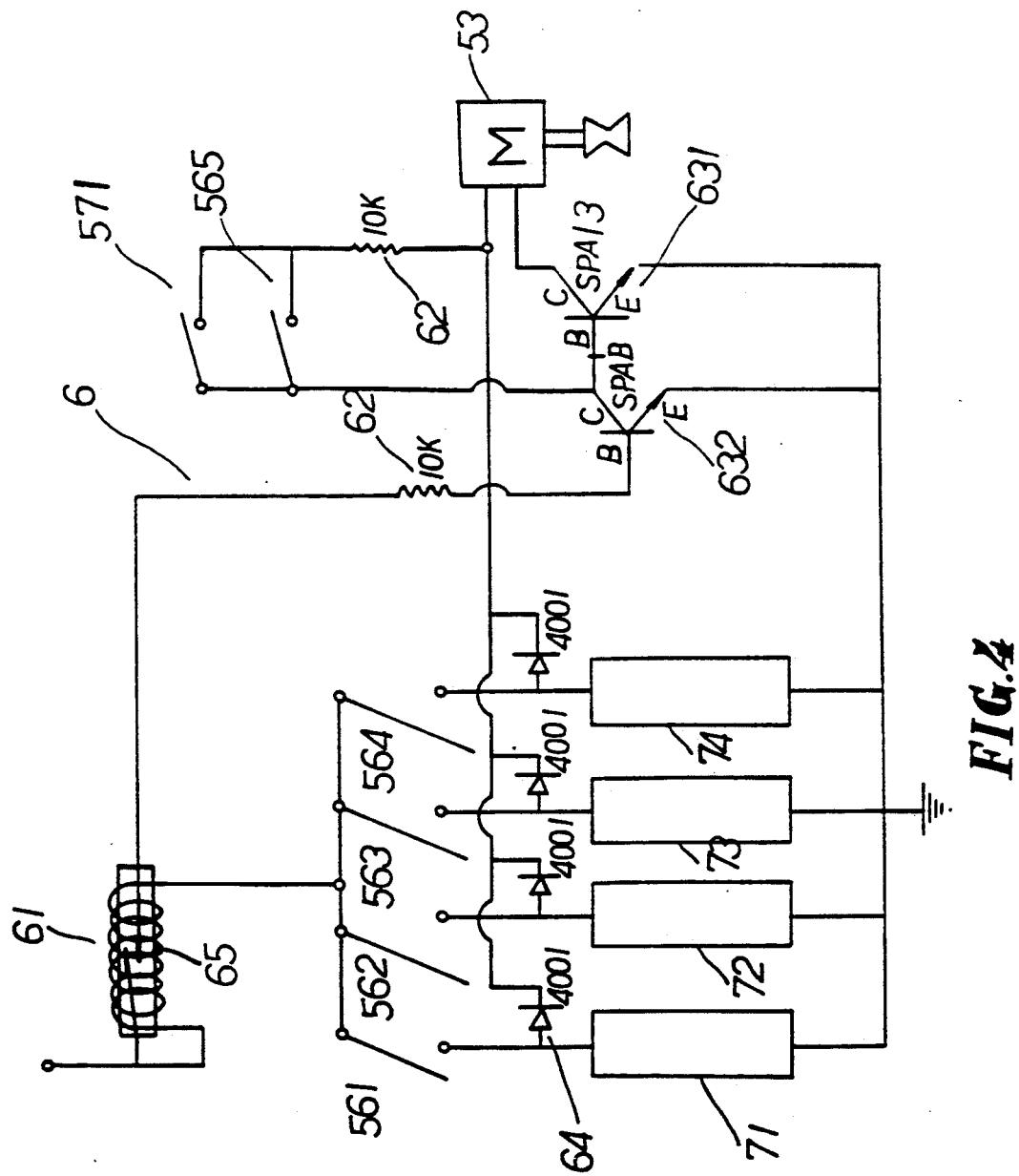
FIG. 4 is a circuit diagram of the circuit control device of this invention.
Figure 5:
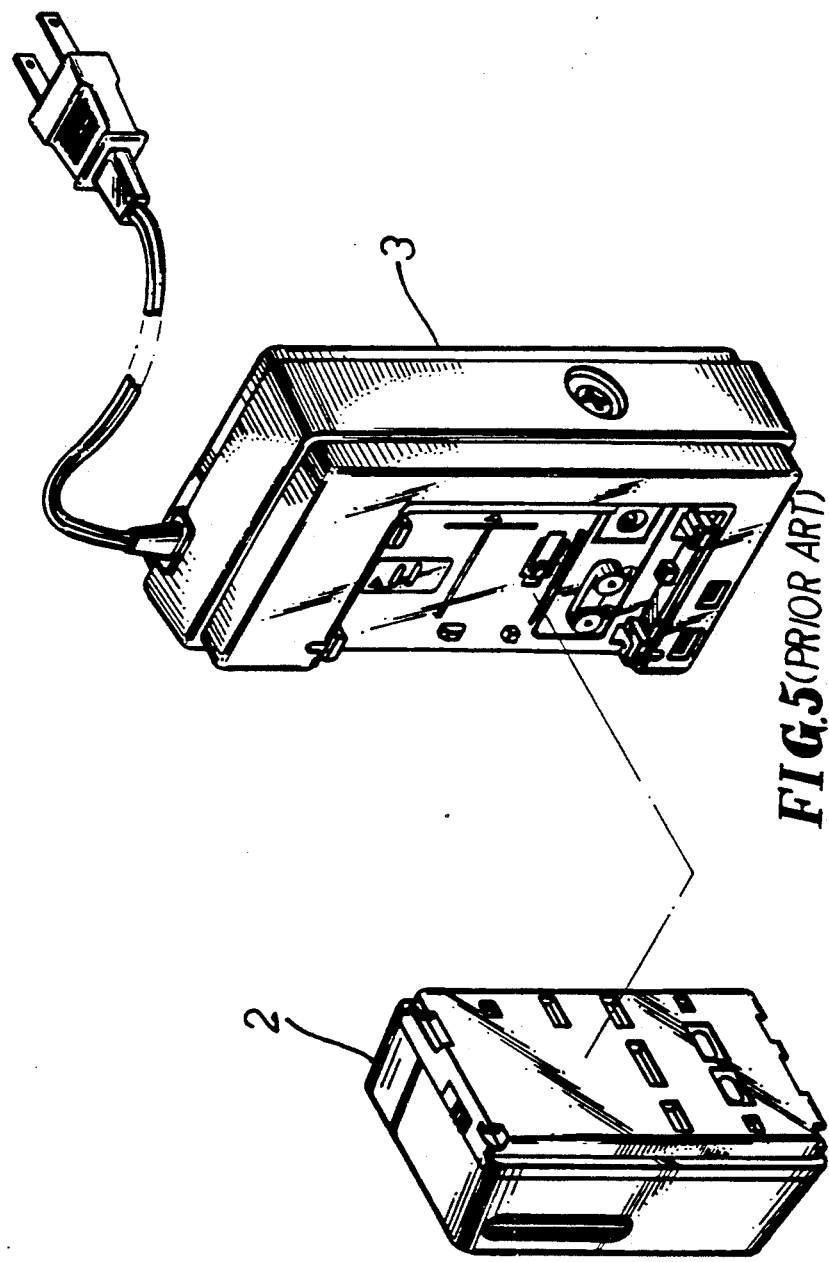
FIG. 5 is a perspective view of a general charging device and a rechargeable battery.

Referring to FIG. 4, the circuit control device 6 includes a magnetic switch 61 wound with about thirty revolutions of coil 65, resistors 62, a transistors 631 and 632 and a diode 64, which cooperate with the microswitches 561 to 564, the drive motor 53 and activating switch 57 for controlling the rotation of the drive motor 53 and the charging operation of the batteries 71 to 74. The base 51 of the switch control device 5 is directly connected with a general charging device 3 as shown in FIG. 3. The engaging seats 41 of the seat member 4 can receive the batteries 71 to 74 to be charged. The contact terminals 57 of the switch control device 5 contact with the charging device 3 while the batteries 74 contact with the conductive terminals 42 of the seat member 4 whereby when the activating switch 571 is pressed to connect the power source, the drive motor 53 is first activated to rotarily drive the reducing gear set 54 and activating member 55. When the activating rod 551 of the activating member 55 activates a first microswitch 561, the dirve motor 53 stops and a first battery 71 to be charged is electrically connected with the power source and charged. When the first battery is completely charged, the circuit control device 6 automatically activates the drive motor 53 to again drive the reducing gear set 54 and activating member 55 so that the activating rod 551 of the activating member 55 will activate a second micro-switch 562 to stop the drive motor 53 and electrically connect a second battery 72 to charge the same. Such procedure is performed repeatedly to sequentially charge the batteries 71 to 74 located on the seat member 4. After the last battery is completely charged, the activating rod 553 will activate a cut off switch 565 to stop charging.

When the charging operation stops, the activating switch 571 and cut off switch 565 are open and the collector C and emitter E are disconnected so that the motor is turned off and stops. When starting to charge, the activating switch is pressed down, and since no current passes through the coil, the magnetic switch 61 is open, and the base B of the transistor 632 is under zero voltage so that the collector C and emitter E are disconnected and the base B of the transistor 631 is under high voltage so that the collector C and emitter E of the transistor 631 are connected and current passes through the motor, enabling the motor to rotate. At this time, the cut off switch 565 is switched to a closed position and remains in this position until several batteries are all completely charged and the activating rod returns to its home position to open the cut off switch. Therefore, even though the activating switch 57 is released, the current will still go through the cut off switch toward the motor to keep the motor rotating. When the activating rod activates the switch 561, the current from the charging device passes throgh the coil and switch 561 to charge the battery 71. Since current flows through the coil, a magnetic field will be produced so that the magnetic switch is connected and current flows through the resistor toward the base B of the transistor 632. Therefore, the potential of the base B of the transistor 632 rises to connect the collector C and emitter E of the transistor 632 so that the potential of the collector C is lowered and consequently, the potential of base B of the transistor 631 is lowered to disconnect the collector C and emitter E of the transistor 631. Therefore, the motor stops rotating, leaving the switch 561 closed and the switches 562, 563, 564, open, i.e., the battery 71 is charged. After the battery 71 is charged completely, the charging device 3 will sense this condition through a sensor or charge indicator in the charging device 3 and cut off the current so that no current flows through the coil and the magnetic switch becomes open and the collector C and emitter E of the transistor 632 are disconnected. The potential of the base B of the transistor 631 rises to connect the collector C and emitter E thereof and the motor is again activated until the switch 562 is activated by the activating rod to start charging the battery 72. The procedure is repeatedly performed until all the batteries are completely charged. The activating rod will then rotate to activate the cut off switch and stop the motor.

To detect if the battery is completely charged, often a fixed current is used to charge the battery and then the voltage is detected. For example, 12A current is used to charge SONY NP-22 6 V battery and the saturated voltage is about 8.5 V. When the battery is charged to 8.5 V, the power is cut off and the voltage of the battery gradually descends from 8.5 V to 6 V. Because the voltage change can not be detected outside the charging device so that the charging state must be identified by detecting if there is charging current. The detecting element must be connected with the circuit in series to detect the current. The detecting element will cause a voltage drop so that the voltage detected by the charging device will be different from that of the charged battery. Most conventional detecting elements are transistors with a voltage drop within a range from 0.5 V to 0.7 V. The magnetic switch applied in this invention is wound with coil whereby when charging current flows through the coil, a magnetic field will be produced to connect the magnetic switch for detecting whether the charging state exists. Respecting the above SONY NP-22 battery, the voltage drop is only about 0.035 V and the influence on the saturated voltage 8.5 V of the battery is little so that the saturated charging state of the battery is hardly affected.

According to the above arrangement, the present invention possesses the following advantages:
1. It can be used in association with general charging device to enhance the functions of the charging device.
2. It can simultaneously receive several batteries to charge these batteries one at a time. The batteries are no longer replaced one by one by labor for charging. Time is saved and the operation is convenient.
3. Multiple batteries are automatically charged in turn until all the batteries are completely charged.

I claim:
1. A continuous battery-charging replacing device for use with a charging device having a charge condition sensor included therewith, comprising
   a seat member having a plurality of engaging seats suitable for receiving batteries to be charged having at least two conductive terminals for each of said engaging seats;
   a switch control device suitable for connection to the charging device and pivotally connected to said seat member;
   and a circuit control device connected to operate said switch control device;
   said switch control device including
      a base and cover attached to said seat member and having located therein
      a drive motor and a reducing gear set connected thereto and driven by said drive motor;
      an activating member connected to and driven by said reducing gear set,
      a plurality of microswitches sequentially activated by said activating member;
      said activating member having a gear meshing with said reducing gear set to rotate said activating member and at least three activating rods disposed respectively above and below said gear for activating said microswitches in sequence for controlling the connection of power from the charging device to said conductive terminals of said engaging seats, charging the batteries in said engaging seats in turn until all batteries are completely charged.

2. The continuous battery-charging replacing device of claim 1 wherein
   said circuit control device includes
      a magnetic switch having a coiled winding and connected in a charging detector circuit, and connected through said microswitches to said conductive terminals and the batteries in said engaging seats.

3. The continuous battery-charging replacing device of claim 2 wherein
   said circuit control device further includes
      a pair of transistors serially connected between said magnetic switch and said drive motor,
      an activating switch and a cut-off switch connected in parallel to each other and between said motor and said transistors.

4. The continuous battery-charging replacing device of claim 3 wherein a terminal from said activating switch and said cut-off switch is connected to a terminal of said drive motor;

a second terminal from said activating switch and said cut-off switch is connected to a base of one of said pair of transistors which said base is connected to the other of said pair of transistors.

5. The continuous battery-charging replacing device of claim 1 wherein contact terminals are located in the bottom of said base positioned for electrically connecting with terminals of the charging device and with said circuit control device.

* * * * *